(12) United States Patent
Hurd et al.

(10) Patent No.: US 12,147,231 B2
(45) Date of Patent: *Nov. 19, 2024

(54) INTEGRATED PLATFORM AND COMMON SOFTWARE STRUCTURAL ARCHITECTURE FOR AUTONOMOUS AGRICULTURAL VEHICLE AND MACHINERY OPERATION

(71) Applicant: Raven Industries, Inc., Sioux Falls, SD (US)

(72) Inventors: Colin Josh Hurd, Ames, IA (US); Mark William Barglof, Burt, IA (US); Quincy Calvin Milloy, Ames, IA (US)

(73) Assignee: Raven Industries, Inc., Sioux Falls, SD (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/172,009

(22) Filed: Feb. 21, 2023

(65) Prior Publication Data

US 2023/0350410 A1    Nov. 2, 2023

Related U.S. Application Data

(63) Continuation of application No. 16/685,994, filed on Nov. 15, 2019, now Pat. No. 11,609,569.
(Continued)

(51) Int. Cl.
*G05D 1/00*    (2024.01)
*A01B 69/04*   (2006.01)
(Continued)

(52) U.S. Cl.
CPC ......... *G05D 1/0088* (2013.01); *A01B 69/008* (2013.01); *A01B 79/005* (2013.01);
(Continued)

(58) Field of Classification Search
CPC .... G05D 1/0088; G05D 1/028; G05D 1/0285; G05D 1/0291; G05D 2201/0201;
(Continued)

(56) References Cited

U.S. PATENT DOCUMENTS

| | | | |
|---|---|---|---|
| 8,195,358 B2 | 6/2012 | Anderson | |
| 2006/0178825 A1* | 8/2006 | Eglington | G05D 1/0278 |
| | | | 701/410 |

(Continued)

FOREIGN PATENT DOCUMENTS

| | | | |
|---|---|---|---|
| AU | 2019380955 B2 | 5/2023 | |
| CA | 3120202 C | 10/2023 | |

(Continued)

OTHER PUBLICATIONS

"U.S. Appl. No. 16/685,994, Non Final Office Action mailed Apr. 28, 2022", 28 pgs.

(Continued)

*Primary Examiner* — Mahmoud S Ismail
(74) *Attorney, Agent, or Firm* — Schwegman Lundberg & Woessner, P.A.

(57) ABSTRACT

A technology platform includes hardware and software components that enable applications of autonomous agricultural equipment operation in an agricultural or other off-road setting, within a common architecture. The technology platform represents a technology stack that is a modular architecture leveraged across multiple use cases and vehicle types. The technology platform includes a vehicle interface component for the physical interface to agricultural equipment, a telematics component that provides stable in-field communications between all aspects of the technology platform, and a perception component that operates as a safety mechanism and includes object detection and classification. Additionally, a cloud-side application performs account (Continued)

management and field setup and as well as syncing of field equipment and operating systems in a common operating system. The technology platform includes an executive control layer that enables porting from one platform to another, so software applications in the integrated technology platform work with hardware of any manufacture.

28 Claims, 4 Drawing Sheets

Related U.S. Application Data (60) Provisional application No. 62/768,023, filed on Nov. 15, 2018.

(51) Int. Cl.
| | |
|---|---|
| *A01B 79/00* | (2006.01) |
| *G06N 5/02* | (2023.01) |
| *G06Q 10/047* | (2023.01) |
| *G06Q 50/02* | (2012.01) |
| *H04Q 9/02* | (2006.01) |
| *H04W 4/40* | (2018.01) |
| *H04W 84/18* | (2009.01) |

(52) U.S. Cl.
CPC .......... *G05D 1/028* (2013.01); *G05D 1/0285* (2013.01); *G05D 1/0291* (2013.01); *G06N 5/02* (2013.01); *G06Q 10/047* (2013.01); *G06Q 50/02* (2013.01); *H04Q 9/02* (2013.01); *H04W 4/40* (2018.02); *H04Q 2209/40* (2013.01); *H04W 84/18* (2013.01)

(58) Field of Classification Search
CPC ...... H04W 4/40; H04W 84/18; A01B 69/008; A01B 79/005; G06N 5/02; G06Q 10/047; G06Q 50/02; H04Q 9/02; H04Q 2209/40
USPC .......................................................... 701/23
See application file for complete search history.

(56) References Cited

U.S. PATENT DOCUMENTS

| | | | | |
|---|---|---|---|---|
| 2014/0012732 A1* | 1/2014 | Lindores | ............... | A01B 79/005 |
| | | | | 705/37 |
| 2016/0147225 A1* | 5/2016 | Sights | ...................... | G01S 19/13 |
| | | | | 701/23 |
| 2016/0161238 A1* | 6/2016 | Pitzer | ...................... | A01D 46/30 |
| | | | | 56/10.2 E |
| 2017/0336787 A1 | 11/2017 | Pichimaier et al. | | |
| 2018/0024549 A1 | 1/2018 | Hurd | | |
| 2019/0171208 A1* | 6/2019 | Magalhães De Matos | ................. | |
| | | | | G05D 1/0027 |
| 2020/0159220 A1 | 5/2020 | Hurd et al. | | |
| 2021/0383193 A1* | 12/2021 | Navoni | ................... | G06N 3/042 |

FOREIGN PATENT DOCUMENTS

| | | | |
|---|---|---|---|
| WO | WO-2015006600 A1 | 1/2015 | |
| WO | WO-2020102763 A1 | 5/2020 | |

OTHER PUBLICATIONS

"U.S. Appl. No. 16/685,994, Notice of Allowability mailed Nov. 23, 2022", 5 pgs.
"U.S. Appl. No. 16/685,994, Notice of Allowance mailed Nov. 14, 2022", 9 pgs.
"U.S. Appl. No. 16/685,994, Response filed Jul. 28, 2022 to Non Final Office Action mailed Apr. 28, 2022", 20 pgs.
"Australian Application Serial No. 2019380955, First Examination Report mailed Mar. 18, 2022", 3 pgs.
"Australian Application Serial No. 2019380955, Response filed Oct. 2, 2022 to First Examination Report mailed Mar. 18, 2022", 22 pgs.
"Australian Application Serial No. 2019380955, Response filed Dec. 21, 2022 to Subsequent Examiners Report mailed Oct. 12, 2022", 11 pgs.
"Australian Application Serial No. 2019380955, Subsequent Examiners Report mailed Oct. 12, 2022", 4 pgs.
"Canadian Application Serial No. 3,120,202, Non Final Office Action mailed May 30, 2022", 4 pgs.
"Canadian Application Serial No. 3,120,202, Response filed Sep. 29, 2022 to Non Final Office Action mailed May 30, 2022", 65 pgs.
"European Application Serial No. 19884633.9, Extended European Search Report mailed Jul. 8, 2022", 8 pgs.
"European Application Serial No. 19884633.9, Response filed Jan. 5, 2022 to Communication pursuant to Rules 161(2) and 162 EPC mailed Jun. 25, 2022", 15 pgs.
"European Application Serial No. 19884633.9, Response filed Jan. 26, 2023 to Extended European Search Report mailed Jul. 8, 2022", 11 pgs.
"International Application Serial No. PCT/US2019/061867, International Search Report mailed Mar. 4, 2020", 4 pgs.
"International Application Serial No. PCT/US2019/061867, Written Opinion mailed Mar. 4, 2020", 7 pgs.
U.S. Appl. No. 16/685,994, filed Nov. 15, 2019, Integrated Platform and Common Software Structural Architecture for Autonomous Agriculture Vehicle and Machinery Operation.
"U.S. Appl. No. 16/685,994, Corrected Notice of Allowability mailed Feb. 22, 2023", 2 pgs.
"European Application Serial No. 19884633.9, Communication Pursuant to Article 94(3) EPC mailed Sep. 6, 2023", 6 pgs.
"Australian Application Serial No. 2023201814, Response filed May 16, 2024 to First Examination Report mailed Mar. 21, 2024", 14 pgs.
"Australian Application Serial No. 2023201814, First Examination Report mailed Mar. 21, 2024", 3 pgs.

* cited by examiner

INTEGRATED PLATFORM AND COMMON SOFTWARE STRUCTURAL ARCHITECTURE FOR AUTONOMOUS AGRICULTURAL VEHICLE AND MACHINERY OPERATION

CROSS-REFERENCE TO RELATED PATENT APPLICATION(S)

This patent application is a continuation of U.S. patent application Ser. No. 16/685,994, filed Nov. 15, 2019, which claims priority to U.S. provisional application No. 62/768,023, filed on Nov. 15, 2018, the contents of which are incorporated in their entirety herein. In accordance with 37 C.F.R. § 1.76, a claim of priority is included in an Application Data Sheet filed concurrently herewith.

FIELD OF THE INVENTION

The present invention relates to autonomous operation of agricultural equipment such as machinery and vehicles. Specifically, the present invention relates to an integrated technology platform for multiple pieces of equipment that enables portability and scalability to perform any application of autonomous machine and vehicle operation in an off-road or in-field environment.

BACKGROUND OF THE INVENTION

In the emerging field of autonomous or unmanned vehicles, many technologies are being developed to safely and efficiently control the operation of vehicles on roadways. While such technology also has application in an off-road setting such as in in-field agricultural activities, many additional challenges hinder the development of autonomous agricultural machinery and vehicles due to the complexities and nature of the usage of such equipment.

Agricultural activity, such as for example sowing or tilling a field, planting or harvesting a crop, or applying artificial precipitation or nutrients to a crop during a growing season, is labor-intensive and requires precise knowledge of conditions within a field in which equipment operates. Additionally, activities such as harvest often occur within very short periods of time, and across a large area (often thousands of acres of land at a time), meaning that efficiency and optimization of equipment and labor usage is a paramount consideration for resource and profit maximization.

Equipment involved in agricultural activities is also very large, and requires specialized operational knowledge. It is also often the case that multiple pieces of equipment are used in the same activity, each requiring separate yet coordinated operation. Accurately and safely automating these operations, and over such large areas, therefore requires a complex approach that takes into account multiple nuances to off-road or in-field applications that are not as relevant in a typical roadway setting.

Another problem with developing autonomous operation of agricultural equipment is the myriad of different hardware and software platforms that must be integrated to enable applications that utilize such technology. It is often the case that different equipment from different manufacturers must operate together, and ensuring that these different pieces of machinery are able to function in unison when being autonomously operated requires careful integration of the various software and hardware functions involved.

Automating agricultural activities has the potential to yield enormous benefits for growers, landowners, crop advisors, and other responsible entities, such as for example substantial cost savings from lost time to a lack of available and qualified labor, improvements in resource utilization, improved efficiencies in conducting agricultural activities that further return cost savings, and improvements in the operation of agricultural equipment itself. Other downstream benefits are also possible, such as advanced crop yield analytics for site-specific prescription mapping and recommendation writing based on data collected as autonomous vehicles operate in a particular field, and improvements in creating and defining of management zones for, for example, variable rate applications of items such as irrigation, fertilizers, and other nutrients.

BRIEF SUMMARY OF THE INVENTION

The present invention addresses these issues by providing a proprietary format for inter-machine and inter-system operational synchronicity. This proprietary format enables full unmanned operation of machinery and vehicles in an agricultural or other off-road/in-field setting, and may be applied in any situation where such synchronicity is demanded.

The present invention is an integrated technology platform that includes multiple hardware and software components within a common software structural architecture, or "stack", for synching equipment and operating systems into a common operating system for autonomous performance of agricultural activities using one or more pieces of equipment. This technology stack is a modular hardware and software platform for autonomous machine and vehicle operation that can be leveraged across multiple use cases and equipment types. The common software structural architecture includes a vehicle interface component responsible for the physical interface to agricultural equipment, a telematics component that enables stable in-field communications between all aspects of the integrated technology platform, a cloud-side application that performs high-level functions such as account management, field setup, and synching of interfaces and operating systems, an executive control layer that enables rapid porting from one platform to another, and an operational component that at least includes object detection and classification for ensuring safe operation of equipment in the performance of an agricultural activity. The present invention also includes a user interface enabling operators to arrange, monitor, and manage specific use cases and applications.

It is therefore one objective of the present invention to provide a system and method of conducting autonomous operation of agricultural machinery. It is another objective of the present invention to provide a system and method of synchronizing and integrating multiple pieces of agricultural machinery to perform agricultural activities where one or more of these pieces is unmanned. It is a further objective of the present invention to provide a common technology format that can rapidly ported to any platform across multiple pieces of software and hardware for enabling autonomous machinery and vehicular operation in an agricultural or other off-road/in-field environment. It is still another objective of the present invention to provide a system and method of conducting agricultural activities using driverless machinery and vehicles that results in improvements in resource utilization, more efficient operation of the driverless machinery and vehicles, and cost savings.

Other objects, embodiments, features and advantages of the present invention will become apparent from the following description of the embodiments, taken together with the accompanying drawings, which illustrate, by way of example, the principles of the invention.

BRIEF DESCRIPTION OF THE SEVERAL VIEWS OF THE DRAWINGS

The accompanying drawings, which are incorporated in and constitute a part of this specification, illustrate several embodiments of the invention and together with the description, serve to explain the principles of the invention.

DETAILED DESCRIPTION OF THE INVENTION

In the following description of the present invention, reference is made to the exemplary embodiments illustrating the principles of the present invention and how it is practiced. Other embodiments will be utilized to practice the present invention and structural and functional changes will be made thereto without departing from the scope of the present invention.

The present invention is a platform that integrates multiple hardware and software elements for automating performance of off-road or in-field machinery and vehicles 102 within a common operating system. Each of these elements involves separate issues, and the present invention provides a common software structural architecture 100 to enable portability, scalability, and seamless communication, so that they can be applied as a package in any application of off-road or in-field autonomous machine and vehicle operation using the common operating system.

The common software structural architecture 100 constructs a technical "stack" which serves as such a common operating system, and can be applied as a package to any situation where autonomous action is necessary in an in-field or off-road environment. This includes specific applications involving multiple machinery or vehicles 102 to enable their autonomous operation, such as for example in performing agricultural activities 104. This "stack" includes multiple components, each of which perform specific elements that integrate various aspects of accomplishing the complex functions involved in autonomous operation of such equipment.

Figure 1:
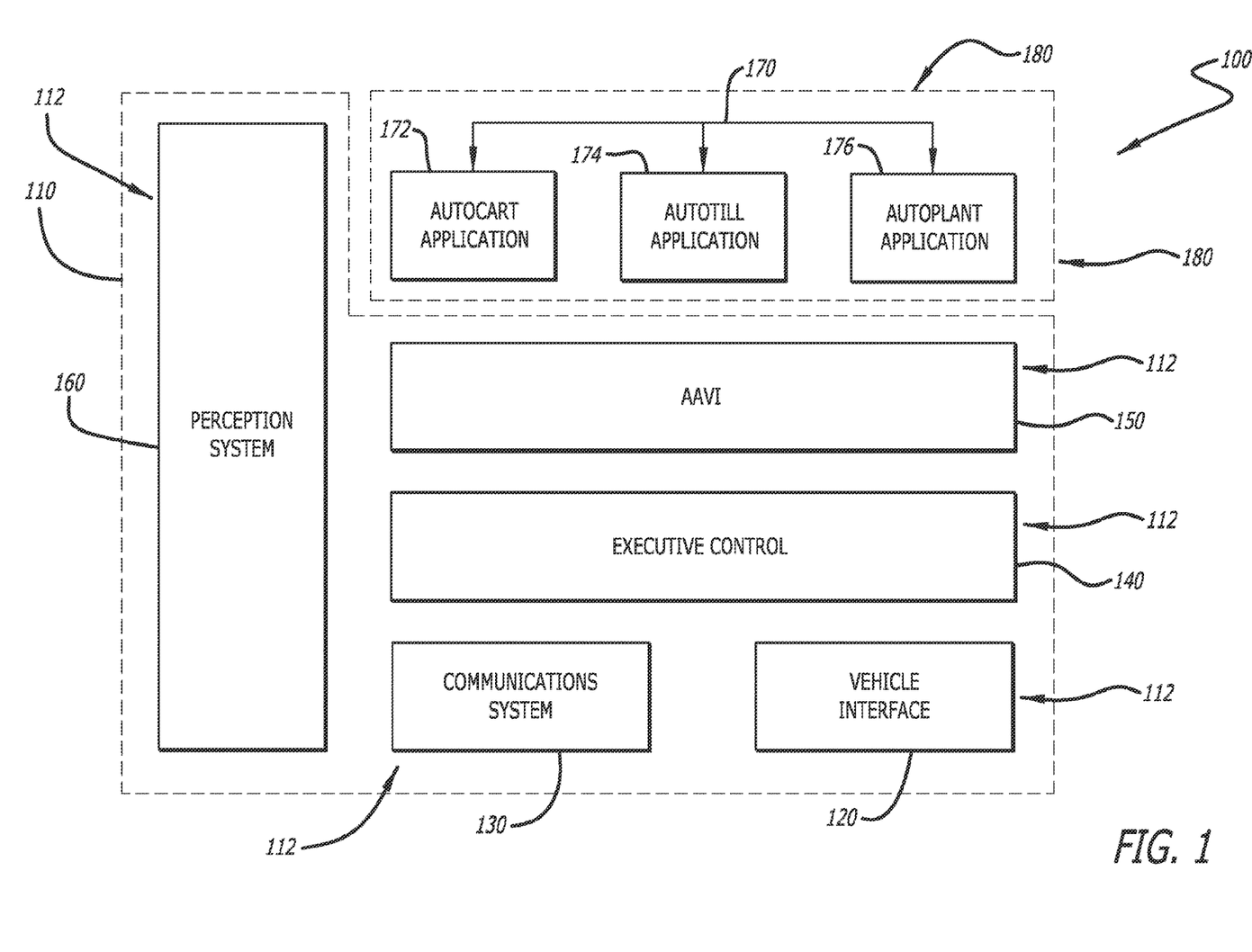
FIG. 1 is a system architecture diagram illustrating functional components in a common software structural architecture according to one aspect of the present invention.

FIG. 1 depicts a block diagram illustrating a common software structural architecture 100 according to the present invention. The common software structural architecture 100 is embodied in a plurality of data processing modules 112 that are components within a computing environment 110 that also includes one or more processors and a plurality of software and hardware components. The one or more processors and plurality of software and hardware components are configured to execute program instructions or routines to perform the components, modules, and functions of the common software structural architecture 100 described herein. The "stack" of the present invention is a proprietary environment in which one or more systems and methods are performed by applying mathematical functions, models or other analytical and data processing techniques in the plurality of data processing modules 112, which ensure seamless autonomous operation of machinery and vehicles 102, regardless of the equipment or applications for which it is utilized.

The common software structural architecture 100 applies these mathematical functions, models or other analytical and data processing techniques within the various integrated elements discussed herein to, in one aspect of the present invention, provide a proprietary and common robotic operating system for agricultural applications. Such a proprietary system can be applied, as noted above, in any off-road or in-field setting, regardless of the hardware and software systems used in machinery and vehicles 102 for communication between the various systems needed for operational performance.

These data processing modules 112 include a vehicle interface system 120, a telematics/communications system 130, an executive control layer 140, and a cloud-side application layer 150, as well as a perception and safety system 160 that analyzes one or more specific operational parameters of autonomous machine and vehicle activity, such as perception of terrain, identification of obstacles, path planning, manipulation of vehicle attributes such as braking, shifting, turning, and gear or mode selection, and other characteristics that enable safe, efficient, and confident autonomous performance. Each of these data processing modules 112 is discussed in further detail herein, but each operates together to enable one or more applications 170 in which autonomously-operated equipment is used to carry out agricultural activities 104, such as for example an AutoCart application 172, an AutoTill application 174, and an AutoPlant application 176. It is to be noted that there are many other possible use cases and applications 170 for such a common software structural architecture 100 in the performance of agricultural activities 104, and therefore the present invention is not to be limited to any application or applications specifically discussed herein. Regardless, the common software structural architecture 100 also further includes a user interface 180, over which users or operators may work within the common software structural architecture 100 to execute the one or more applications 170.

In one example of how the common software structural architecture 100 coordinates functions for integration of multiple machinery and vehicles 102 for performance of autonomous and/or unmanned agricultural activities 104, equipment being operated remotely or without piloting needs to be able receive instructions on speed, direction, and turning characteristics such as a degree of curvature for navigating a field. The "stack" enables creation of a series of waypoints, which are sets of geographical coordinates used to determine a route and determine how to get from a first point to a second point (or multiple points) within such a route, as well as how to operate (what functions to perform, and at what time) while going along such a route. These activities require complex cooperation and communication between multiple pieces of equipment, and between vehicles and cloud-based systems, and the present invention enables these functions (for example, path planning, navigation, handshaking vehicle-to-vehicle and from vehicle to cloud-based software application) for any machine or vehicle 102 and for any operational situation.

As noted above, one component of the common software structural architecture 100 is a vehicle interface system 120. This data processing module 112 is responsible for managing the physical interface(s) to any vehicular system used in performance of an agricultural activity 104. This portion of the technology stack embodied in the common software structural architecture 100 integrates with vehicular functions, such as control of steering, throttle, gear state and braking, enabling full automation of all aspects of vehicular operation remotely, regardless of the equipment's manufacture.

Synchronizing vehicular interfaces to enable such integration poses many challenges. Modern agricultural equipment is configured with numerous electronic systems and subsystems, often referred to as electronic control units, and each may be configured with a separate processor. Some of these are independent, but communications among others are often essential. For example, one subsystem may need to control actuators or receive feedback from sensors. A protocol is often implemented to meet on-board, inter-system communications needs, commonly known as a CAN (controller area network). The CAN is a serial data bus standard designed to combine and connect these electronic control units. The vehicle interface system 120 of the present invention is designed to communicate with agricultural equipment electronically via this CAN bus.

However, different equipment may have different configurations, and each manufacturer may have their own proprietary system protocols, making standardized communications across different types of equipment (and controlling vehicular functions) using the CAN bus much more difficult. The vehicular interface system 120 provides standardized protocols within the common operating system for interfacing with on-board systems via the CAN bus, so that any functionality on any piece of equipment can be practiced within the common software structural architecture 100.

Another component of the common software structural architecture 100 is an executive control layer 140, which allows for rapid porting of the entire common operating system from one technical platform to another. The executive control layer 140 is a software subsystem that coordinates control of autonomously-operated equipment, and is responsible for micro-services that may include command messaging, safety supervision, in-field mission control, path planning, and machine configuration.

The executive control layer 140 sits on top of the vehicle interface system 120 and enables any software in the autonomous operating environment to which the format is applied to work with any piece of hardware. The executive control layer 140 enables the common software structural architecture 100 to effectively act as a common operating system as noted above for all autonomous operation of machines and vehicles 102 in an off-road or in-field setting, providing a secure format between all equipment and protocols.

The executive control layer 140 also enables integration of application programing interfaces (APIs) to allow third parties to build their own use cases via the user interface 180, similar to the applications 170 such as AutoCart, AutoTill and AutoPlant use cases described below. The present invention contemplates that any number of APIs may be possible, but that regardless, the executive control layer 140 enables seamless cross-platform functionality, regardless of the operating system upon which a particular platform is built. For example, the executive control layer 140 enables the technology stack of the present invention to be ported to different Linux-based systems, with a fast integration time that enables an autonomous agricultural operation involving multiple equipment and systems very quickly.

Another component of the common software structural architecture 100 is a robust communications system 130, which as noted above enables seamless communications from vehicle to vehicle and from vehicle to cloud, as well as between vehicles and other systems. This data processing module 112 includes telematics hardware, such as an embedded server, and enables multi-channel capabilities that permit transmission using radio (RF), Wi-Fi, broadband, and cellular networks such as 4G LTE or 5G, as well as a host of input/output (I/O) options allowing for autonomous vehicle operations and expandability and scaling of the common operating system as a whole.

Figure 2:
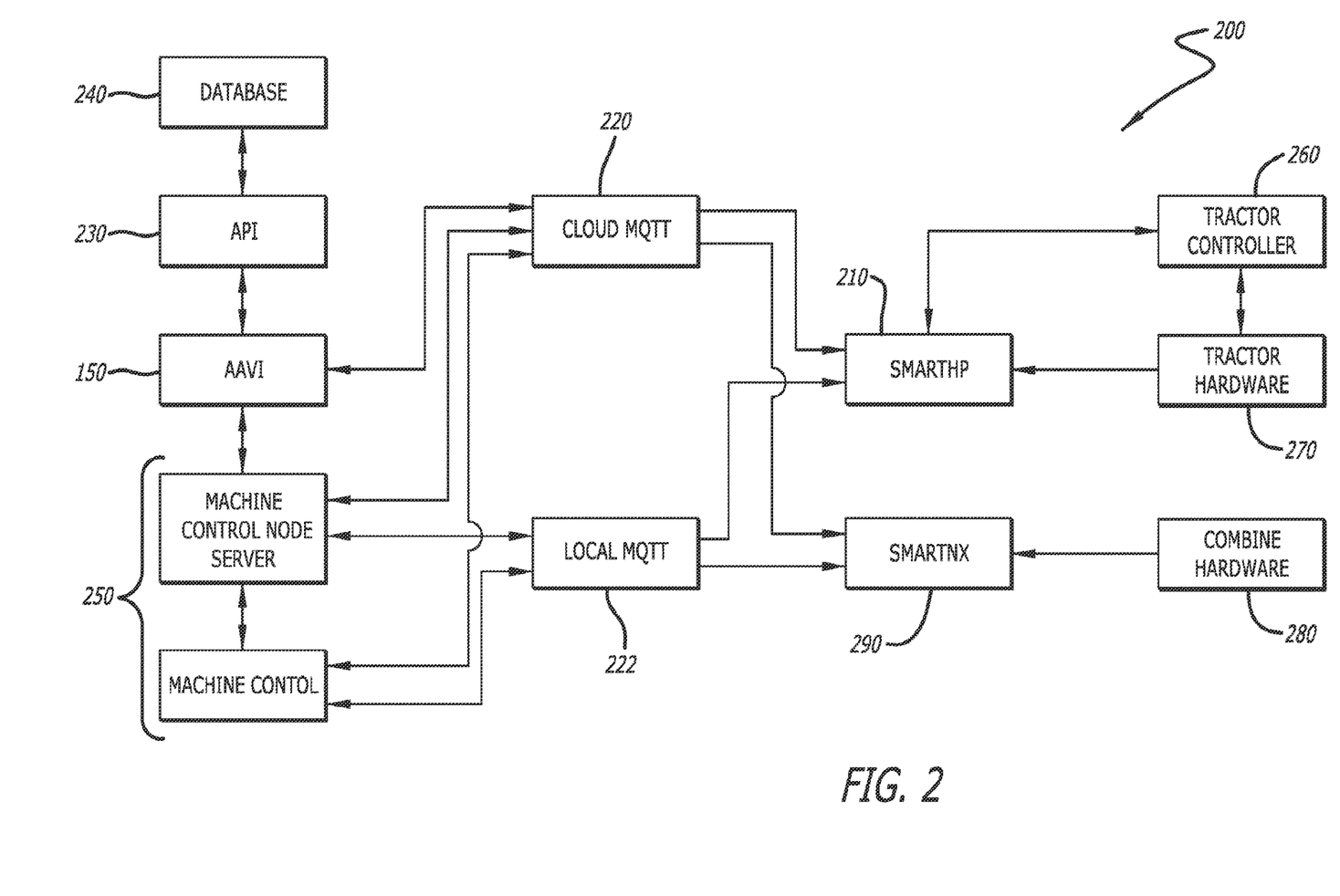
FIG. 2 is a block diagram illustrating a framework for communications within the common software structural architecture according to the present invention.

FIG. 2 is a block diagram illustrating a framework 200 representing one exemplary embodiment of such a communications system 130 in the common software structural architecture 100 between hardware elements on agricultural machinery and vehicles 102, and cloud-side elements such as the Autonomous Agricultural Vehicle Interface (AAVI) 150 responsible for account management, field data storage, sensor data storage, pairing vehicles for autonomous operations, and vehicle configuration management.

In such a framework 200, agricultural machinery and vehicles include receiver hardware 210 and telemetry hardware 290, which are installed on such machinery and vehicles 102 to effectively turn any piece of agricultural equipment into one capable of autonomous operation. The receiver hardware 210 and telemetry hardware 290 are configured to communicate, either over a cloud-based protocol 220 or a localized protocol 222, with the components of the common software structural architecture 100 responsible for such account, data, and configuration management aspects of the present invention.

The receiver hardware 210 is configured to enable receipt of commands from cloud-side elements of the common software structural architecture 100, or from an operator. This hardware 210 executes those commands by translating the information therein for the specific piece of equipment on which the receiver hardware 210 is installed, and communicates with controller hardware 260. This in turn executes the commands via equipment hardware 270. The telemetry hardware 290 is a telemetry device that is configured to collect and transmit data from equipment, such as for example a combine harvester via specific hardware 280 installed thereon.

As noted above, information is communicated from the receiver hardware 210 and the telemetry hardware 290 via communications protocols 220 and 222. A cloud-based protocol 220 (using for example the MQTT (Message Queuing Telemetry Transport) protocol, is used to communicate data between agricultural machinery and vehicles 102 and the cloud-side elements of the common software structural architecture 100, such as the AAVI component subsystem 150 and machine control elements 250, such as a controller and a server, responsible for managing configuration and performance of equipment within the common software structural architecture 100. The AAVI subsystem 150 may include one or more APIs 230, through which additional elements may provide and store data within the communications framework 200 and the common software structural architecture 100, such as a database 240. A more localized approach may also be used via a local protocol 222, which is capable of enabling communications between the agricultural machinery and vehicles 102 and the machine control elements 250 directly.

Regardless, it is to be understood that the communications system 130 of the common software structural architecture 100 introduces and enables many different characteristics to the technology stack, such as providing for a structured messaging system, as well as rules for prioritizing messages and a filtering system for managing duplicate messages such as those sent over both Wi-Fi and the local/nearest cellular network. The communications system 130 may utilize many different protocols, such as for example the MQTT protocol, which is a lightweight messaging protocol for small sensors and mobile devices, optimized for high-latency or unreliable networks. This is especially useful for rural areas (such as where agricultural activity often takes place), where cellular and/or Wi-Fi or broadband coverage is not as robust or reliable as in urbanized areas. Nonetheless, it is to be understood that any other messaging protocol may also be incorporated into the present invention, including but not limited to Advanced Message Queuing Protocol (AMQP), Streaming Text Oriented Messaging Protocol (STOMP), Web Application Messaging Protocol (WAMP), and any other protocol now known or to be developed.

The communications system 130 is therefore a hardware and software subsystem which enables reliable in-field communications through cell-denied operations and other challenging operating environments. The hardware portion of the communications system 130 may comprise, in one embodiment thereof, a ruggedized server with 4G LTE/5G cellular capabilities, and a ruggedized pseudo-mesh long range radio system. It is to be understood however that many other physical implementations of hardware within the communications system 130 may be utilized.

Still another component of the common software structural architecture 100 is a cloud-side application 150 as noted above, that performs multiple aspects of configuration and integration for conducting autonomous machine and vehicular operations. This data processing module 112 carries out functions such as syncing operating systems and interfaces with field equipment, as well as activity-specific functions such as field setup and location mapping to ready the various hardware and software elements, and agricultural equipment, for autonomous activity. The cloud-side application 150, also referred to herein as an Autonomous Agricultural Vehicle Interface (AAVI) system 150, is a multi-faceted cloud/in-field hybrid software subsystem that is responsible for account management, field data storage, sensor data storage, pairing vehicles for autonomous operations, and vehicle configuration management. For example, this aspect of the present invention creates a configuration file during the syncing operation which may be updated as the performance of the agricultural activity progress, which enables the various functions to be implemented. The AAVI system 150 contains the main APIs between a user interface 180 and autonomous vehicle microservices managed by other components of the common software structural architecture 100.

One implementation of this element of the common software structural architecture 100 of the present invention is as a kit for installation on a vehicle such as a tractor to coordinate an automated performance of a grain cart therewith in an "AutoCart™" application 172. In other words, the kit represents a portion of the common software structural architecture 100 that can be ported to specific applications or use cases for autonomous agricultural activity 104 by syncing different systems and different field equipment for a vehicle-to-vehicle operations.

The AAVI system 150 of the common software structural architecture 100 also allows for seamless use of local, mesh and cloud-based communication platforms that enable autonomous vehicle applications. For example, this component enables the "AutoCart™" application 172 to operate by configuring and initializing tractor-to-grain cart integration. The AAVI system 150 performs field, location, and machine setup functions, and enables users to configure performance elements such as selecting maximum and minimum gears, turn angle, combine head selection, and row width.

This component of the common software structural architecture 100 may also include collection of data that can be used to "learn" and improve on vehicle-to-vehicle functionality for future operations, and to improve on the portability and scalability of the present invention as a whole, in one or more applications of artificial intelligence and machine learning within the technology stack. This cloud-side application 150 therefore enables and includes data processing techniques that involves one or more mathematical functions that allow for seamless, multi-faceted operation in complicated off-road or in-field environments, and which can be implemented to accomplish any other specific agricultural activity 104.

The common software structural architecture 100 also includes a safety system 160 which is responsible for analyzing specific operational parameters of autonomous vehicle activity. This module, referred to in FIG. 1 as a "perception" system 160, recognizes and distinguishes terrain to be covered by autonomously-operated equipment, and performs tasks such as identification of obstacles and other characteristics that enable safe, efficient, and confident performance of machines and vehicles 102 in such an operating environment. The perception system 160 is responsible for intake and analysis of data (such as images and reflected signals) from an array of sensors (such as cameras, radar systems and Lidar systems), and may include one or more machine learning and artificial intelligence subsystems configured to fuse data collected from multiple sensors together to provide the autonomously-operated machinery and vehicles 102 with situational awareness to avoid obstacles and other terrain characteristics during the performance of agricultural activities 104.

The perception system 160 incorporates data processing techniques that perform object detection, classification, ranging, and trajectory analysis in one or more additional modules or software subsystems. This may include analyzing LiDar, radar and video data, for example by processing images from multiple cameras and evaluating attributes of images by correlation of pixel parameters, to perform depth relation and mapping. Such processing may correlate each pixel in an image to a grid to determine an object's position, evaluate distance from reflected signals in data collected from radar systems, and evaluate point-cloud data collected from LiDar systems to extract a ground plane and cluster and segment data representing objects in a field of view of the machinery and vehicles 102.

The perception and safety system 160 may also include applying geo-referencing techniques to tag each object identified and evaluate GPS data to identify position and heading, for example, of machines 102 used in agricultural activities 104. This may also be used to "learn" distance, position, and identification of objects, and applied to train one or more artificial intelligence models, for example to improve identification of images obtained using thermal cameras, and improve depth relation.

This may be also used for path planning manipulation of vehicle attributes such as braking, shifting, turning, and gear or mode selection, for example to calculate a vehicle's drivable pathway based on heading and position data, and the machine's operational characteristics such as turning radius capability. The perception system 160, and others in the common software structural architecture 100, may still further include applying edge computing techniques to enable faster handling and analyzing of data.

Figure 3:
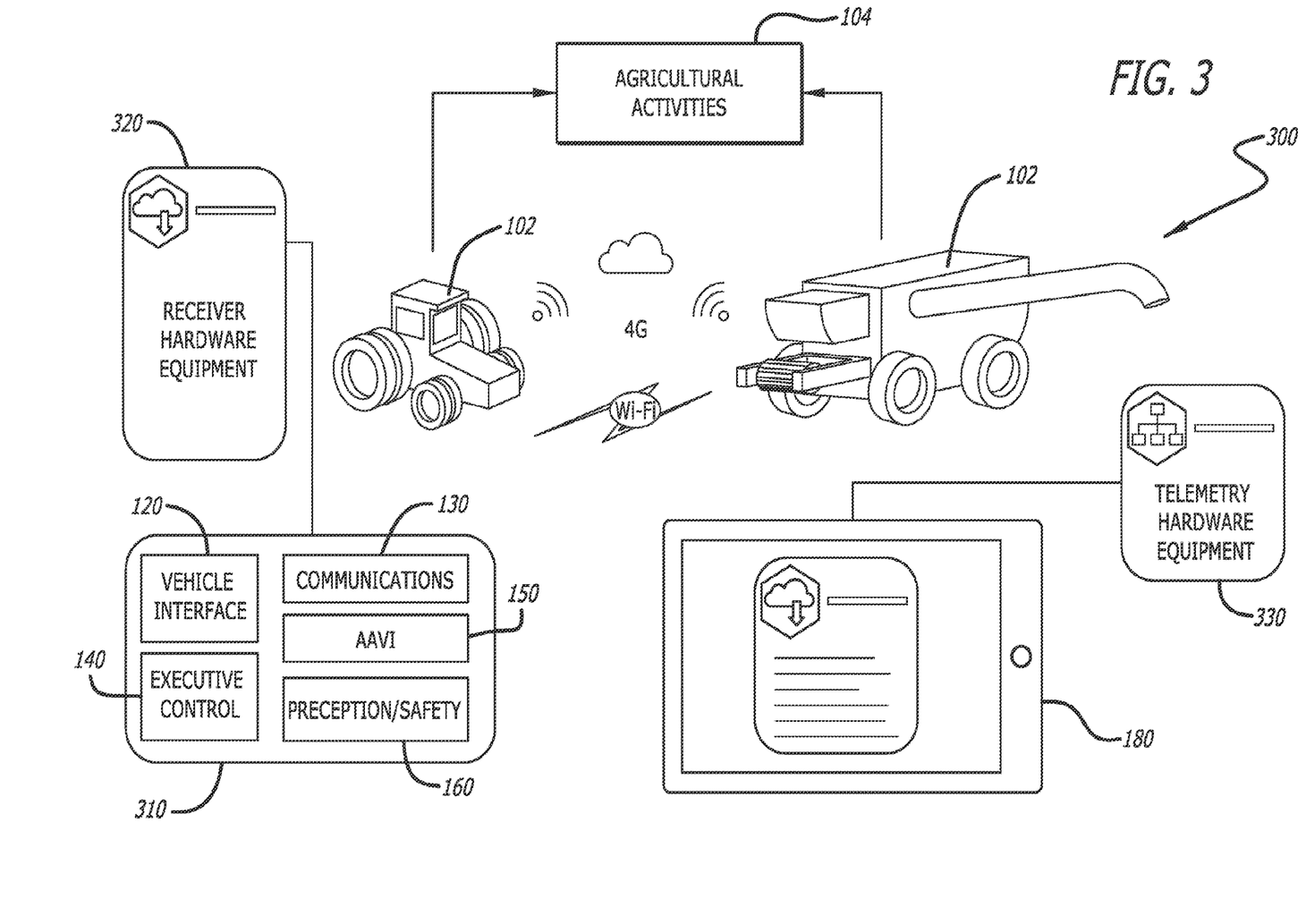
FIG. 3 is a system diagram of a basic grain cart operation according to one exemplary implementation of the common software structural architecture.

As noted above with respect to FIG. 1, the various components of the common software structural architecture 100 enable several operational outputs and specific use cases in one or more applications 170, and these may be managed via the user interface 180. One such use case, referred to above as "AutoCart™", is an application 172 that relies on all elements of the technology stack comprising the present invention. FIG. 3 is a system diagram of a basic grain cart operation 300 according to one exemplary implementation of the common software structural architecture 100 for performing the AutoCart™ application 172.

As shown in FIG. 3, a grain cart operation 300 implements the components 310 of the common software structural architecture 100, to turn a tractor or other piece of equipment 102 into a fully automated machine to coordinate an automated performance of a grain cart therewith in the conduct of agricultural activities 104. The AutoCart™ application 172 is, for example, capable of safely moving a tractor between waypoints in a field, and syncing with a combine during harvest operation, to fill and empty grain carts as the equipment moves through a field to be harvested. The AutoCart™ application 172 also is configurable with user interface 180, which resides on a tablet or other computing device (mobile or otherwise) configured in equipment such as a tractor or combine 102. In FIG. 3, the components 310 communicate with hardware equipment 320 configured with equipment such as a tractor or combine 102. Additionally, telemetry hardware 330 provides data collected from the equipment 102 operating in a field to the user interface 180.

Many other specific agricultural applications or use cases are contemplated, and are within the scope of the utility of the common software structural architecture 100 of the present invention. For example, the technology stack of the common software structural architecture 100 may enable an "AutoTill" application 174 that performs post-harvest and/or pre-planting tillage operations to prepare soil by mechanical agitation by automating specific tillage equipment. common software structural architecture 100 enables such an AutoTill application 174 by configuring and initializing tilling machinery. This may include identifying heading and position for tilling equipment in a particular field, and configuring operational characteristics such as turning radius capability, and controlling mechanical characteristics such as gear shifting, speed, and braking. The AutoTill application 174 may also include the user interface 180, again which resides on a tablet or other computing device (mobile or otherwise) configured in equipment used for the tilling application.

Similarly, the technology stack of the common software structural architecture 100 may enable an "AutoPlant" application 176 that performs sowing, seeding, or planting operations using specific automated equipment. The common software structural architecture 100 enables such an Auto-Plant application 176 by configuring and initializing this specific equipment, which may include identifying heading and position in a particular field, and again configuring operational characteristics such as turning radius capability, and controlling mechanical characteristics such as gear shifting, speed, and braking. The user interface 180 is also usable with the AutoPlant application 176, and any other specific application 170.

In addition, many further autonomous vehicle applications outside of the field of agriculture are also possible, for example through partnering and developing strategic relationships for use of the common architectural format of the present invention.

Figure 4:
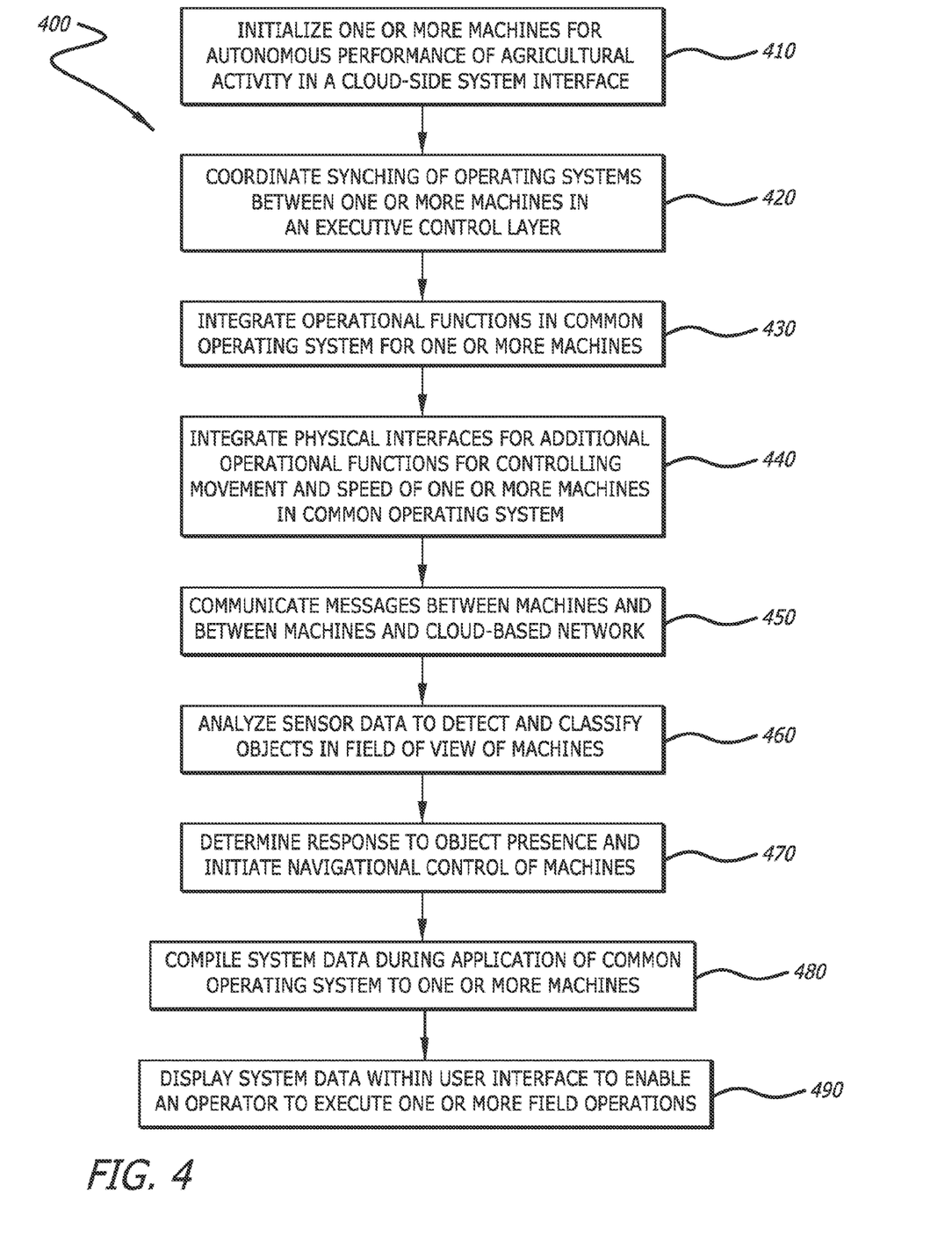
FIG. 4 is a flowchart illustrating steps in a process of applying the common software structural architecture for implementing a common operating system for one or more machines in the performance of an agricultural activity, according to another aspect of the present invention.

FIG. 4 is a flowchart illustrating steps in a process 400 of applying the common software structural architecture 100 for implementing a common operating system for one or more machines 102 in the performance of an agricultural activity 104, according to another aspect of the present invention. The process 400 begins at step 410 by initializing the one or more machines 102, and interfaces and operating systems thereon, for autonomous performance of agricultural activity 104 in the cloud-side system interface and application 150. In this step, the common software structural architecture 100 is configured to perform several high-level system functions, such as one account management, arrange for centralized data storage for information such as field data and sensor data collected by the plurality of sensors coupled to the one or more machines 102, a pairing of the one or more machines 102 to be used in the autonomous performance of the agricultural activity 104, and machine configuration management. At step 420, the process continues by coordinating a synching of operating systems between one or more machines 102 in the executive control layer 140. This includes integrating operational functions attendant to conducting the agricultural activity 104, such as messaging, safety supervision, in-field mission control, path planning, field setup, and location mapping for a geographical location that includes a particular field where the one or more machines 102 are or will operate. These steps therefore develop the integrated common operating system to be used for autonomous operation of the one or more machines 102, as shown at step 430.

At step 440, the process 200 continues by integrating physical interfaces for additional operational functions for the one or more machines 102, such as controlling movement and speed, within the common operating system. This is accomplished within the vehicle interface system 120. These additional operational functions include steering, braking, changing a speed, changing a gear, and other characteristics of movement and speed of the one or more machines 102.

The process 400 also manages communications within the common operating system, as indicated at step 450. This includes communicating messages between machines and between machines and the cloud-based network within the common software structural architecture 100 is implemented, and occurs using a plurality of messaging protocols, the use of which may be selected by network availability. As noted above, an available network may include one or more of radio (RF), Wi-Fi, broadband, or cellular networks such as 4G LTE or 5G.

At steps 460 and 470, the perception and safety system 160 analyzes sensor data collected from the plurality of sensors to detect and classify objects in field of view of the one or more machines 102, and determines a response to a presence of an object in that field of view. This may include initiating a change in navigational or other characteristics of navigational control of the one or more machines 102, such as for example changing speed, changing gears, stopping, braking, or adjusting some other aspect of the vehicular state of the one or more machines 102.

In addition to these operational functions enabled the common software structural architecture 100, the process 400 also supports a user interface 180 by compiling system data during application of common operating system to one or more machines 102 at step 480, and displaying the system data within the user interface 180 to enable an operator to execute one or more field operations representing the agricultural activity 104, such as the AutoCart application 172, the AutoTill application 174, and the AutoPlant application 176.

It is to be understood that steps discussed in the process 400 of FIG. 4 need not be performed in a specific order, and that the various steps of process 400 may occur in any order, in whole or in part, or simultaneously in the development of a common operating system for the one or more machines 102 in the performance of the agricultural activity 104.

As noted above, the common software structural architecture 100 may allow for one or more layers or techniques of artificial intelligence to be applied to assist various aspects of the present invention to operate, such as for example analyzing images and reflected signals from the plurality of sensors to detect and classify the objects in the field of view of the one or more machines 102. Additionally, these artificial intelligence techniques may be used to evaluate a vehicular state for controlling the movement and the speed of the one or more machines 102 in response to the presence of objects, such as evaluating one or more of latitude, longitude, speed, heading, yaw-rate, a turning radius, and global position system zones representing a geographical location.

Artificial intelligence and other types of machine learning may be used to associate and compare information in various types of sensor data, and to identify attributes in such sensor data, to produce detections of objects and to predict movement of those detected objects. The applications of artificial intelligence in the present invention may include one or more neural networks configured to develop relationships among and between the information within the various types of sensor data to recognize objects across images and reflected signals from different types of sensors having different fields of view, which are used to determine whether action needs to be taken to manipulate and control the autonomously-operated machines and vehicles 102. Artificial intelligence may therefore be used in the present invention at least within the perception and safety module 160 for safe operation of the one or more machines 102 in the performance of an agricultural activity 104.

The present invention contemplates that many different types of artificial intelligence may be employed within the scope thereof, and therefore, the data processing modules 112 of the present invention and sub-systems comprised thereof may include one or more of such types of artificial intelligence. This may include techniques such as k-nearest neighbor (KNN), logistic regression, support vector machines or networks (SVM), and one or more neural networks as noted above, such as a convolutional neural network (CNN), a fully convolutional neural network (FCN), or a Recurrent Neural Network (RNN).

The systems and methods of the present invention may be implemented in many different computing environments 110. For example, the framework for hosting and executing subscription-based, end-to-end agricultural workflows in a permissioned, distributed ledger may be implemented in conjunction with a special purpose computer, a programmed microprocessor or microcontroller and peripheral integrated circuit element(s), an ASIC or other integrated circuit, a digital signal processor, electronic or logic circuitry such as discrete element circuit, a programmable logic device or gate array such as a PLD, PLA, FPGA, PAL, and any comparable means. In general, any means of implementing the methodology illustrated herein can be used to implement the various aspects of the present invention. Exemplary hardware that can be used for the present invention includes computers, handheld devices, telephones (e.g., cellular, Internet enabled, digital, analog, hybrids, and others), and other such hardware. Some of these devices include processors (e.g., a single or multiple microprocessors), memory, nonvolatile storage, input devices, and output devices. Furthermore, alternative software implementations including, but not limited to, distributed processing, parallel processing, or virtual machine processing can also be configured to perform the methods described herein.

The systems and methods of the present invention may also be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Additionally, the data processing functions disclosed herein may be performed by one or more program instructions stored in or executed by such memory, and further may be performed by one or more modules configured to carry out those program instructions. Modules are intended to refer to any known or later developed hardware, software, firmware, artificial intelligence, fuzzy logic, expert system or combination of hardware and software that is capable of performing the data processing functionality described herein.

The foregoing descriptions of embodiments of the present invention have been presented for the purposes of illustration and description. It is not intended to be exhaustive or to limit the invention to the precise forms disclosed. Accordingly, many alterations, modifications and variations are possible in light of the above teachings, may be made by those having ordinary skill in the art without departing from the spirit and scope of the invention. It is therefore intended that the scope of the invention be limited not by this detailed description. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

The invention claimed is:

1. A system for integrating one or more machines to autonomously perform an agricultural activity, comprising:
   a computing environment stack including at least one non-transitory computer-readable storage medium having program instructions stored therein and a computer processor operable to execute the program instructions to configure operation of the one or more machines in an autonomous performance of one or more autonomous field operations within a common operating system, wherein the computing environment stack includes:
   an application layer having the one or more autonomous field operations, each of the one or more autonomous field operations includes the autonomous field operation to be conducted and one or more parameters for conducting the autonomous field operation;
   a cloud-side application layer configured to initialize the one or more machines for the autonomous performance of the one or more autonomous field operations;
   an executive control layer in communication with one or more of the application layer or the cloud-side application layer, the executive control layer configured to coordinate syncing of operating systems between the one or more machines, in-field mission control, path planning, field setup, and implementing the computing environment stack as the common operating system for the one or more machines;
   a vehicle interface in communication with the executive control layer, the vehicle interface configured to integrate the computing environment stack with the physical interfaces of the one or more machines for controlling one or more of steering, braking, speed, or gear;
   a communications system, the communications system configured to communicate messages between the one or more machines and between the one or more machines and a cloud-based network; and
   a perception and safety system in communication, by way of an edge computing interface, with each of the application layer, the cloud-side application layer, and the executive control layer, the perception and safety system configured to analyze input data collected by a plurality of sensors associated with one or more machines to detect and classify one or more objects for one or more of the application layer, cloud-side application layer or the executive control layer.

2. The system of claim 1, wherein the perception and safety system in communication with each of the application layer, the cloud-side application layer, and the executive control layer by way of the edge computing interface includes direct communication of the perception and safety system with each of the application layer, the cloud-side application layer, and the executive control layer.

3. The system of claim 1, wherein the executive control layer is in communication with each of the application layer and the cloud-side application layer.

4. The system of claim 3, wherein the executive control layer is in communication with the communications system.

5. The system of claim 1, wherein the perception and safety system is configured to determine one or more responses for the one or more machines to one or more objects detected and classified with the perception and safety system.

6. The system of claim 5, wherein the executive control layer is configured to implement the one or more responses to one or more objects as part of one or more of in-field mission control or path planning.

7. The system of claim 1, wherein the cloud-side application layer is configured to pair the one or more machines for autonomous performance of the one or more autonomous field operations.

8. The system of claim 1, wherein the one or more autonomous field operations include a grain cart application, a tilling application, a harvest application, and a planting application.

9. The system of claim 1 comprising the plurality of sensors.

10. The system of claim 9, wherein the plurality of sensors include one or more of cameras, radar systems, or Lidar systems.

11. The system of claim 1 comprising a user interface layer configured to compile system data during an application of the common operating system to the one or more machines representing the autonomous performance of the agricultural activity and display the system data within a user interface to permit an operator to execute one or more field operations in the autonomous performance of the agricultural activity using the one or more machines over the common operating system.

12. The system of claim 1, wherein the one or more machines includes a tractor, a combine, or a grain cart.

13. The system of claim 1, comprising the one or more machines.

14. The system of claim 1, wherein the vehicle interface configured to integrate the computing environment stack with the physical interfaces of the one or more machines for controlling one or more of steering, braking, speed, or gear includes the vehicle interface configured to integrate the computing environment stack with the physical interfaces of the one or more machines for controlling implement function.

15. A system for integrating one or more machines to autonomously perform an agricultural activity, comprising:
   a computing environment stack including at least one non-transitory computer-readable storage medium having program instructions stored therein and a computer processor operable to execute the program instructions to configure operation of the one or more machines in an autonomous performance of one or more autonomous field operations within a common operating system, wherein the computing environment stack includes:

an application layer having the one or more autonomous field operations, each of the one or more autonomous field operations includes the autonomous field operation to be conducted and one or more parameters for conducting the autonomous field operation;

a cloud-side application layer configured to initialize the one or more machines for the autonomous performance of the one or more autonomous field operations;

an executive control layer in communication with each of the application layer and the cloud-side application layer, the executive control layer configured to coordinate syncing of operating systems between the one or more machines, in-field mission control, path planning, field setup, and implementing the computing environment stack as the common operating system for the one or more machines;

a vehicle interface in communication with the executive control layer, the vehicle interface configured to integrate the computing environment stack with the physical interfaces of the one or more machines for controlling one or more of steering, braking, speed, gear, or implement function;

a communications system, the communications system configured to communicate messages between the one or more machines and between the one or more machines and a cloud-based network; and a perception and safety system in direct communication, by way of an edge computing interface, with each of the application layer, the cloud-side application layer, and the executive control layer, the perception and safety system configured to analyze input data collected by a plurality of sensors associated with one or more machines to detect and classify one or more objects for one or more of the application layer, cloud-side application layer or the executive control layer.

16. The system of claim 15, wherein the perception and safety system in direction communication by way of an edge computing includes the precepting and safety system in direct communication with the application layer without the cloud-side application layer and the executive control layer intervening therebetween.

17. The system of claim 15, wherein the perception and safety system in direction communication by way of an edge computing includes the precepting and safety system in direct communication with the cloud-side application layer without the application layer and the executive control layer intervening therebetween.

18. The system of claim 15, wherein the perception and safety system in direction communication by way of an edge computing includes the precepting and safety system in direct communication with the executive control layer without the application layer and the cloud-side application layer intervening therebetween.

19. The system of claim 15, wherein the executive control layer is in communication with the communications system.

20. The system of claim 15, wherein the perception and safety system is configured to determine one or more responses for the one or more machines to one or more objects detected and classified with the perception and safety system.

21. The system of claim 20, wherein the executive control layer is configured to implement the one or more responses to one or more objects as part of one or more of in-field mission control or path planning.

22. The system of claim 15, wherein the one or more autonomous field operations include a grain cart application, a tilling application, a harvest application, and a planting application.

23. The system of claim 15 comprising the plurality of sensors.

24. The system of claim 15, wherein the plurality of sensors include one or more of cameras, radar systems, or Lidar systems.

25. The system of claim 15, wherein the perception and safety module is configured to apply one or more artificial intelligence techniques to analyze images and reflected signals from the plurality of sensors to detect and classify the one or more objects.

26. The system of claim 15 comprising a user interface layer configured to compile system data during an application of the common operating system to the one or more machines representing the autonomous performance of the agricultural activity and display the system data within a user interface to permit an operator to execute one or more field operations in the autonomous performance of the agricultural activity using the one or more machines over the common operating system.

27. The system of claim 15, wherein the vehicle interface configured to integrate the computing environment stack with the physical interfaces of the one or more machines for controlling one or more of steering, braking, speed, or gear includes the vehicle interface configured to integrate the computing environment stack with the physical interfaces of the one or more machines for controlling implement function.

28. The system of claim 15, wherein the one or more machines includes a tractor, a combine, or a grain cart.

* * * * *